R. W. BEATON.
COMPRESSION STOP AND WASTE COCK.
APPLICATION FILED JUNE 13, 1907.
911,365.
Patented Feb. 2, 1909.
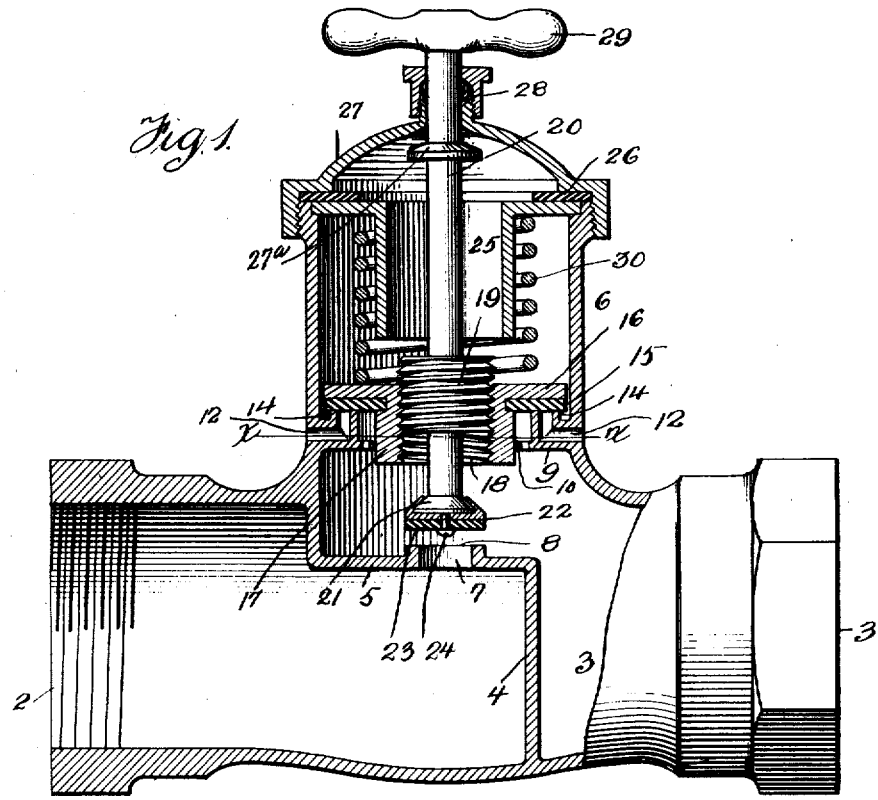
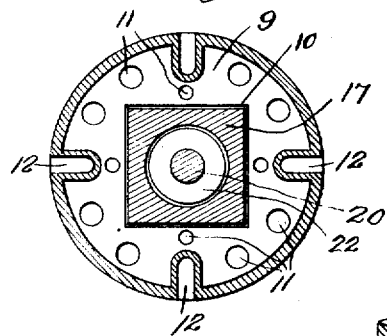
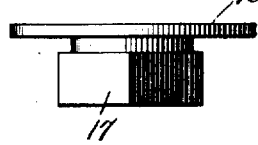
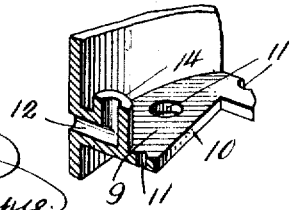
WITNESSES:
Samuel Payne
K. H. Butler
INVENTOR
Robert W. Beaton.
By H. C. Evert & Co.
Attorneys

UNITED STATES PATENT OFFICE.

ROBERT W. BEATON, OF PITTSBURG, PENNSYLVANIA.

COMPRESSION STOP AND WASTE COCK.

No. 911,365.    Specification of Letters Patent.    Patented Feb. 2, 1909.

Application filed June 13, 1907. Serial No. 378,843.

*To all whom it may concern:*

Be it known that I, ROBERT W. BEATON, citizen of the United States of America, residing at Pittsburg, in the county of Allegheny and State of Pennsylvania, have invented certain new and useful Improvements in Compression Stop and Waste Cocks, of which the following is a specification, reference being had therein to the accompanying drawing.

This invention relates to a compression stop and waste cock, and the invention has for its object to provide a novel cock for shutting off a supply of water or similar liquid and draining that portion of the pipe cut off from the main water supply.

To this end, I have devised a novel valve wherein positive and reliable means are employed for closing the valve and opening drain ports, whereby the back pressure of water in a pipe can be relieved. The valve is especially designed for water mains, where it is desired to drain the mains or their outlet pipes and prevent the same from bursting, by water freezing in the mains or pipes.

The detailed construction of the compression stop and waste cock will be presently described and then specifically pointed out in the appended claims.

Referring to the drawing forming part of this specification, like numerals of reference designate corresponding parts throughout the several views, in which, Figure 1 is a vertical sectional view of the valve. Fig. 2 is a horizontal sectional view taken on the line x—x of Fig. 1. Fig. 3 is an elevation of a port valve, and Fig. 4 is a perspective view of a portion of the valve casing.

To put my invention into practice, I provide an inverted T-shaped body or valve casing, having a water inlet 2, and an outlet 3. The valve body is provided with a transverse partition 4 having a horizontal portion 5 beneath the bonnet 6 of the valve body, said horizontal portion being provided with an opening 7 surrounded by a valve seat 8.

The bonnet 6 is formed with a horizontal partition 9 formed with a central rectangular opening 10 and with a plurality of openings 11. The bonnet is formed with a plurality of drain ports 12, each port having a seat 14. These drain ports as will be seen by reference to Fig. 4 are substantially L-shape in form, the horizontal portions of the ports opening at the exterior of the bonnet and the vertical portions thereof being within bosses formed integral with the walls of the bonnet and with the partition 9, the upper ends of said bosses forming seats 14. Resting upon the seats 14 of the ports 12 is a gasket 15 carried by a port valve 16, said valve having a rectangular boss or nut 17 projecting into the opening 10 of the partition 9. The boss or nut 17 is interiorly threaded, as at 18, to receive a threaded enlargement 19 carried by a valve stem 20. The lower end of the valve stem 20 is provided with a beveled head 21 upon which is secured a valve, embodying a metallic member 22 and a gasket 23, said member 22 and gasket 23 being secured to the head 21 by a screw 24. The member 22 is preferably made of malleable metal and is bent to engage the head 21, whereby it can be revolved upon said head.

The upper end of the valve stem 20 passes through a depending sleeve 25, seating in the top of the bonnet 6 and retained therein by a gasket 26 and a cap 27 threaded upon the upper end of the bonnet 6. The sleeve 25 serves functionally to guide the spring 30 in its compression, also to limit the upward movement of the port valve 16. The stem 20 passes through a conventional form of stuffing-box 28, carried by the cap 27 and is provided with a handle 29. The stem 20 directly beneath the cap 27 is provided with a collar 27ª for limiting the upward movement of the stem 20, preventing said stem from being screwed from the port valve 16, unless the cap 27 is removed.

Surrounding the sleeve 25 and bearing upon the port valve 16 is a coiled spring 30 employed for normally holding the port valve 16 upon the seats 14 of the ports 12.

When water or similar liquid is passing through the valve body, the valve stem 20 is elevated, as illustrated in Fig. 1 of the drawings. To shut off a supply of water, the valve stem 20 is rotated until the gasket 23 engages the seat 8 of the partition 5, and upon further rotation of the stem 20, the port valve 16 is elevated, allowing water to drain through the ports 12, until practically all the pipes connecting with the opening 3 have been thoroughly drained of water.

The gasket 23 frictionally engaging the seat 8, allows the head 21 to revolve in the valve 22. During such revolution of the head 21, the screw 24 is carried therewith, the shank of the screw at the point where the latter is engaged by the valve 22 and the gasket 23 being free from threads, so that the screw may be readily revolved in said valve and gasket. In opening the valve, the port valve 16 is first seated before the gasket 23, valve 22 and valve stem can be elevated.

It is thought the construction and operation of the valve will be fully understood from the foregoing description taken in connection with the drawings, and I reserve the right to make such structural changes as are permissible by the appended claims.

Having fully described my invention, what I claim and desire to secure by Letters Patent is:

1. A valve consisting of a body having an inlet and an outlet opening, a bonnet carried by said body, a partition arranged in said body and having an opening formed therein, a horizontally disposed partition arranged in said bonnet, said partition having a plurality of openings formed therein drain ports formed in said bonnet, a port valve mounted in one of said openings in the partition in said bonnet and adapted to normally close said drain ports, a valve stem threaded in said port valve and having a head, a revoluble valve carried by said head for closing the opening in the first mentioned partition, a depending sleeve mounted in said bonnet, a spring surrounding said sleeve and bearing upon said port valve, and a cap carried by said bonnet for guiding the movement of said valve stem.

2. The combination of a valve body, a partition arranged in said body and provided with an opening, a bonnet carried by said body, a partition arranged in said bonnet and having a central opening and a plurality of openings arranged around the central opening, a plurality of drain ports in said bonnet, the walls of which extend upwardly within the bonnet and form seats, a port valve normally engaging said seats and having a depending interiorly-threaded nut projecting into the central opening in said bonnet partition, a valve stem threaded into said nut, a valve revolubly mounted on the lower end of said stem for closing the opening in the valve body partition, a cap carried by said bonnet for guiding the movement of said stem, and a spring arranged within said bonnet and bearing upon said port valve for holding the valve during a period of rotation of said valve stem.

3. In a valve, the combination with a body having a partition formed therein provided with an opening, of a bonnet carried by said body, a partition arranged in said bonnet having a central opening and also having ports formed therein, said bonnet having a plurality of drain ports formed therein, a valve stem extending through the central opening of said partition, a valve carried by said stem for closing the first mentioned opening, means surrounding said stem and moved thereby for closing the drain ports in said bonnet, and means for holding the first mentioned means during a period of rotation of said valve stem.

4. The combination with a valve casing having a partition between the inlet and outlet of the casing, said partition having an opening and a valve seat surrounding the opening, of a bonnet carried by the valve casing and provided at its lower end with a partition provided with a central opening and a plurality of openings around the central opening, a plurality of bosses integral with the bonnet and said bonnet partition and projecting upwardly from the partition, drain ports extending through said bosses and bonnet, a port valve seating on the upper ends of said bosses and normally closing the drain ports and having a nut engaging the central opening in said bonnet partition, a valve stem having a threaded portion engaging said nut, a valve on the lower end of said stem for engaging the valve seat carried by the first mentioned partition, and means in the bonnet engaging the port valve for normally holding the same seated to close the drain ports.

In testimony whereof I affix my signature in the presence of two witnesses.

ROBERT W. BEATON.

Witnesses:
MAX H. SROLOVITZ,
A. J. TRIGG.